United States Patent [19]

Pearse et al.

[11] Patent Number: 5,270,920
[45] Date of Patent: Dec. 14, 1993

[54] EXPERT SYSTEM SCHEDULER AND SCHEDULING METHOD

[75] Inventors: Derek Pearse, Bedford; William C. Jones, Arlington, both of Tex.

[73] Assignee: Hughes Training, Inc., Arlington, Tex.

[21] Appl. No.: 704,567

[22] Filed: May 13, 1991

[51] Int. Cl.5 .................. G06F 15/22; G06F 15/24
[52] U.S. Cl. ................................................. 364/401
[58] Field of Search ............... 364/401, 419; 395/926

[56] References Cited

U.S. PATENT DOCUMENTS

| | | | |
|---|---|---|---|
| 4,626,836 | 12/1986 | Curtis et al. | 340/706 |
| 4,807,155 | 2/1989 | Cree et al. | 395/161 |
| 4,817,018 | 3/1989 | Cree et al. | 395/155 |
| 4,819,191 | 4/1989 | Scully et al. | 395/161 |
| 4,831,552 | 5/1989 | Scully et al. | 395/153 |
| 5,023,851 | 6/1991 | Masrray et al. | 368/41 |
| 5,050,077 | 9/1991 | Vincent | 364/410 |
| 5,093,813 | 3/1992 | Levine | 368/10 |
| 5,111,391 | 5/1992 | Fields et al. | 364/401 |
| 5,197,000 | 3/1993 | Vincent | 364/401 |

Primary Examiner—Roy N. Envall, Jr.
Assistant Examiner—Laura Brutman
Attorney, Agent, or Firm—Wanda K. Denson-Low

[57] ABSTRACT

A scheduling system and method for use with training systems. The exemplary embodiment of the scheduler is incorporated into an aircrew training system for a military aircraft. A training system for training aircrews involves the use of academic media such as classrooms, training devices such as ground-based flight simulation trainers, and training flights in the air. In addition, it involves a computer network having terminals located at a central site, a plurality of training sites, and other remote sites. The computer data base is located at a central site, and the training facilities are located at training sites. Typically, computer terminals are connected together in a computer network by both dedicated and dial-up telephone lines, and typically the network may employ Intel 80386 machines running UNIX V, release 3.2. The scheduler of the present invention comprises an integrated system of hardware and software which is integrated into the already existing training system. It is embedded as a software subsystem in the training system, and is delivered on a type 80386 integrated circuit based computer element at each training site.

14 Claims, 14 Drawing Sheets

EXPERT SYSTEM SCHEDULER AND SCHEDULING METHOD

BACKGROUND

The present invention relates generally to scheduling of training resources, and more particularly, to an expert system scheduler that performs administrative and managerial functions necessary for operating, managing and revising of the schedules for training systems.

Currently, the scheduling of Air Force flight training classes (events) at a plurality of training sites is accomplished using a plurality of interconnected, distributed computers that are interconnected to a central database. The database generally comprises, among other things, a list of students input from the plurality of distributed computers, a list of instructors, and a list of available flight training events. However, schedules are apt to vary over time, since necessary resources are not always available at the time they are required, and since conflicts are apt to arise from time to time.

Consequently, it would be an improvement in the art to provide for a scheduler and scheduling method that is flexible in that it is capable of dynamically rescheduling users and resources in order to adjust for conflicts that arise.

SUMMARY OF THE INVENTION

In order to overcome the limitations of conventional scheduling systems and methods, the present invention is an expert system scheduler for flexibly scheduling training events at a plurality of training sites notwithstanding the occurrence of resource conflicts. Each training site comprises one of a plurality of distributed computers that are interconnected by means of an interconnecting link. The distributed computers are interconnected to a central processor that includes a database. The database at least comprises a list of students input from the plurality of remote computers, a list of instructors, and a list of available flight training events. The availability of the students, the instructors and the available training events vary over time.

The expert system scheduler generally comprises a computer processor that is disposed at each of the remote sites. Each expert system scheduler comprises means for selectively generating a master plan in response to training requests supplied by users. The master plan provides an event flow that specifies target dates for each training event, but does not specify the exact time or resources and does not take into account whether sufficient resources are available on a target date. The training requests inform the scheduler that a specific number of users should be scheduled for a particular training event, and stipulate required starting and ending dates for the events. The master plan provides users with a preview of the proposed event sequence and an overview of all events which are targeted for the same date.

The scheduler also comprises means for adjusting the master plan so that users may adjust starting, interim and ending training dates in order to express preferred scheduling constraints. The scheduler also comprises means for selectively generating a master schedule in response to training requests and the users preferred scheduling constraints which reserves specific dates, times, locations and resources for each training event to fulfill scheduled training requests. Furthermore, the scheduler comprises means for generating conflict alerts to notify users if conflicts with the master schedule exist. Means are provided for generating revised training requests in response to conflict alerts. Means are provided for automatically generating schedule revision options in response to the revised training requests which appropriately reschedule the sites in view of conflicts.

In operation, the expert system scheduler flexibly schedules and reschedules training events at each of the sites notwithstanding resource conflicts, and wherein schedules are automatically generated and conflicts resolved.

The expert system scheduler and scheduling method in accordance with the present invention provides administrative and managerial resources necessary for the day-to-day operating, managing, and revising of training, user, instructor and resource schedules. The expert system scheduler comprises an integrated system of hardware and software that provides schedule generation required for management of the training system. The expert scheduler includes capabilities not currently available in existing scheduling systems. These capabilities include: expert system scheduling capability comprising an unlimited number of students, resources and instructors; schedules generated for a full year to the 15 minute interval level with all priorities satisfied and conflicts resolved or identified; seamless interfacing of commercial software packages and custom software into the system; and software that is readily adaptable to a variety of hardware platforms.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 4A and 4B are a diagram giving the training event state perspective of the training system incorporating the invention of FIGS. 2-8.

DETAILED DESCRIPTION

The present invention is a scheduling system for use with training systems. It should be clearly understood that the expert scheduler of the present invention finds utility in any kind of training system that provides training for any purpose. In the description that follows hereinafter, the invention will be described in relation to the training of aircrews for the operation of aircraft. For purposes of explanation, an exemplary embodiment of the invention in a military environment is shown, but it should be clearly understood that the invention also has utility in a civilian setting.

Figure 1A:
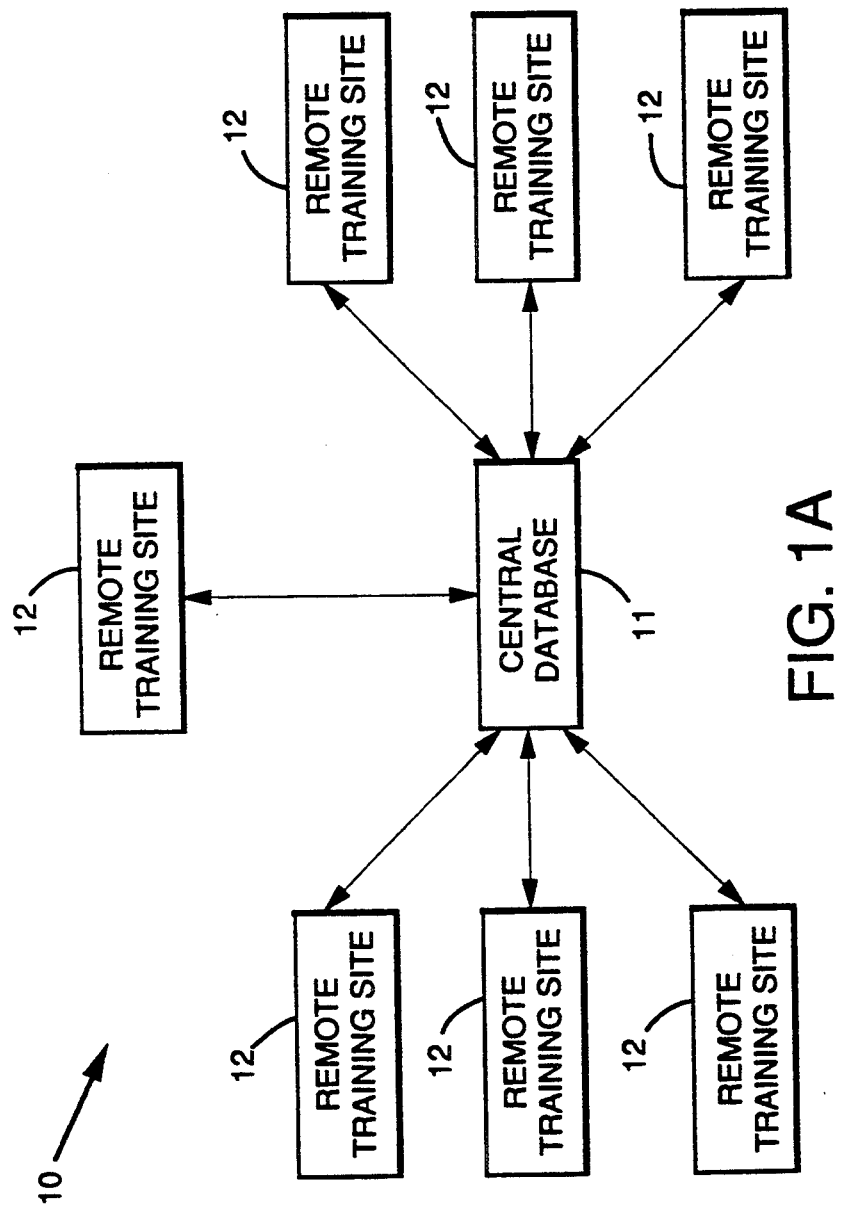
FIG. 1A is a block diagram illustrating the basic organizational concept of a system that uses an expert scheduler in accordance with the present invention.

Referring now to FIG. 1A, the exemplary embodiment of the scheduler of the present invention is incorporated into an aircrew training system 10 for a military aircraft identified as the C-141. The aircrew training system 10 involves the use of academic media such as classrooms, training devices such as ground-based flight simulation trainers, and training flights in the air. In addition, it involves a computer network having terminals located at a central site 11, and at a plurality of training sites 12. In addition, other locations (not shown) may be tied into the aircrew training system 10, such as reserve bases, Air National Guard bases, and the like. The computer data base for the aircrew training system 10 is located at the central site 11, and the training facilities are located at the training sites 12. Computer terminals at the central site 11 and at the training sites 12 are connected together in a computer network by means of telephone lines. In addition, remote computer terminals may also be tied into the network from various additional locations such as reserve bases and Air National Guard bases. Typically, the computer network is interconnected by both dedicated and dial-up telephone lines, and typically the network may employ Intel 80386 machines running UNIX V, release 3.2. The scheduler of the present invention comprises an integrated system of hardware and software which provides scheduling of students, resources and instructors. The students may be studying for the position of pilot, co-pilot, flight engineer, air refueling engineer, weapons engineer, and etc. The resources may include flight bases, formal school, seminars, and simulator trainers including cockpit procedures trainers, weapon system trainers, air refueling part task trainers, load master part task trainers, and the like.

The purpose of the scheduling system of the present invention is to perform all administrative and managerial functions necessary for operating, managing and revising of the schedules for the aircrew training system 10. It is to be understood that the expert scheduler of the present invention is to be integrated into the already existing aircrew training system 10. The expert scheduler of the present invention is embedded as a software subsystem in the aircrew training system 10, and is delivered on a 80386 based computer element at each training site 12. The expert scheduler of the present invention is implemented as a demand driven, priority constraint based scheduling system. In response to user's training requests, the expert scheduler delivers earliest opportunity schedules which satisfy allocation policies under limited resource availability.

The primary purpose of the expert scheduler of the present invention is to facilitate orderly scheduling of training events. Key features of the expert scheduler include automatic schedule generation, objective, consistent and valid schedules, the issuance of schedule conflict alerts, flexible scheduling control policies, and effective scheduling refinement options.

Figure 1B:
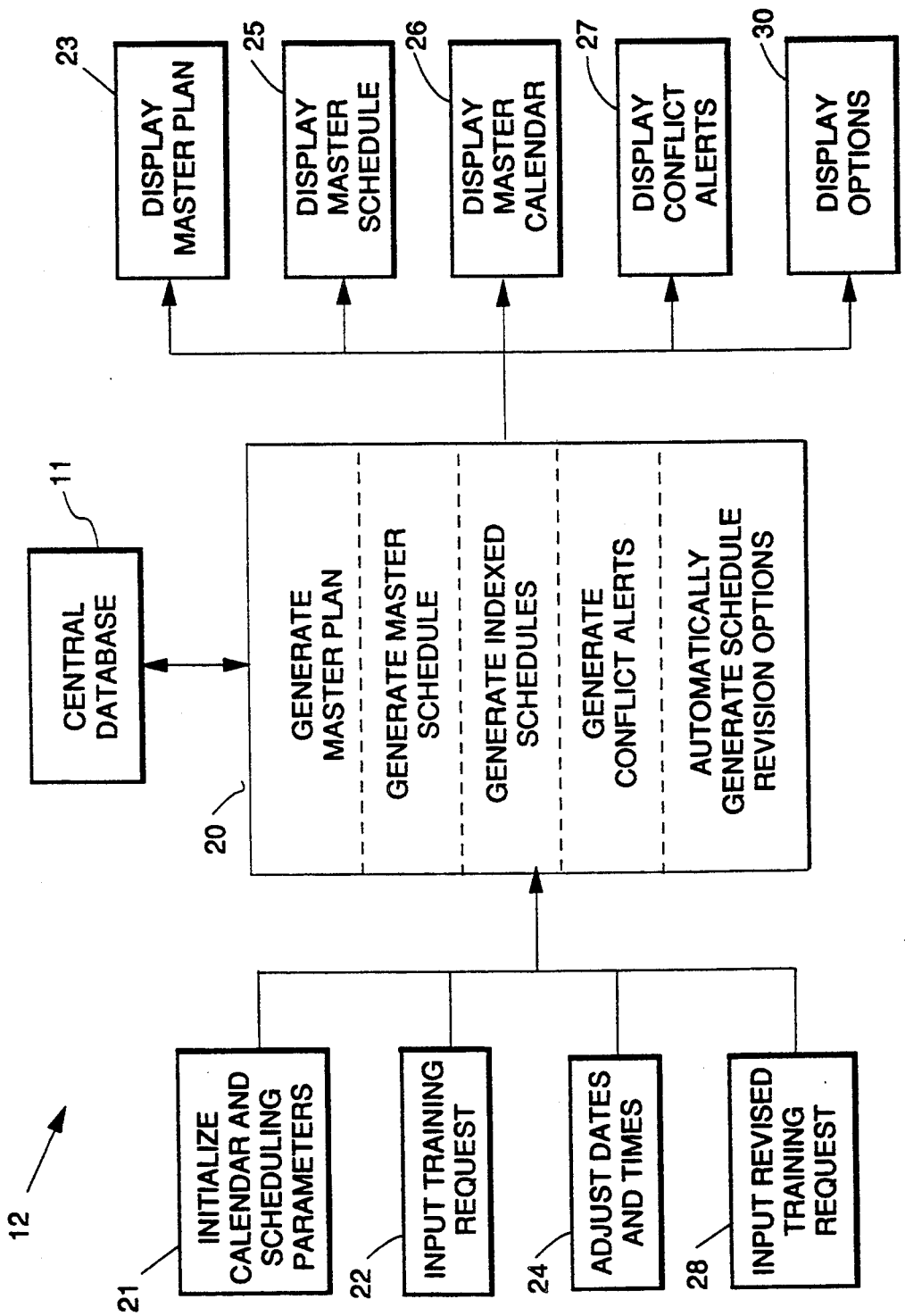
FIG. 1B is a block diagram illustrating process flow details of the expert scheduler in accordance with the present invention that is employed in the system of FIG. 1A.

Referring now to FIG. 1B, the expert scheduler of the present invention located at one of the remote sites 12 operates generally as follows. The remote site 12 is linked to the central data base 11. During system installation, users input initial constraints into a computer 20. These relate to a workshift calendar and a scheduling parameters database which stipulate general scheduling constraints 21. These parameters are used by the scheduler of the present invention to restrict the dates and times during which resources may be used and to establish priorities by which resources are allocated. Users input training requests 22 to inform the scheduler that a particular course or training event must be held for a specified number of students. These requests also stipulate required starting and ending dates for the courses. On request, the scheduler produces a master plan 23. The master plan 23 lays out course flows which accommodate the training requests 22 at a gross level. It specifies the target date for holding each course training event, but does not specify the exact time or resources. Nor does it take into account whether or not sufficient resources are available during the target date. This master plan 23 provides users with a preview of the proposed event sequence and an overview of all events which are targeted for the same date. Users review and revise the master plan 23. If appropriate, users manually adjust the starting, interim or ending training dates 24 to express preferred scheduling constraints. Upon user request, the scheduler generates a master schedule 25 which reserves specific dates, times, locations and resources for each event as necessary to fulfill the training requests. The workshift calendar, scheduling parameters, training requests 22 and master plan 23 are used to constrain and guide the scheduling process. Upon user request, the scheduler publishes a master calendar 26 and schedules per course, crew, student, instructor, resource and event. The scheduler also generates conflict alerts 27 to notify users if constraints are violated, e.g. scheduled date is beyond planned target date. When exception conditions occur, e.g. a class is cancelled due to device failure, users will submit a revision request 28. In response, the scheduler offers automatic or manual schedule revision options 30 including utilities to identify alternative resources and subsequent opportunities.

The expert scheduler of the present invention prints out a large number of documents, including reports, schedules, calendars and plans. An inventory of the documents produced by the scheduler is given in Table I.

TABLE I

| Document Inventory. | |
|---|---|
| Report | Description |
| Alert Report | Detected constraint violations |
| Course Schedule | Detailed event schedule per course |
| Crew Schedule | Detailed event schedule per crew |
| Date Calendar | Standard monthly calendar |
| Event Schedule | Detailed event schedule per event |
| Flight Report | Scheduled flight events, flight requests |
| Instructor Schedule | Detailed event schedule per instructor |
| Location Schedule | Detailed event schedule per location |
| Master Plan | Course flow, target event dates |

TABLE I-continued

Document Inventory

| Report | Description |
|---|---|
| Master Schedule | Detailed event schedule per day |
| Next Opportunity Report | Alternative date, time & resource for event |
| Projections Report | Potential schedule for modified workshift |
| Resource Option Report | Alternative resource for event on date |
| Resource Report | Site inventory & resource qualifications |
| Resource Schedule | Detailed event schedule per resource |
| Resource Utilization Report | Projected resource supply vs demand |
| Scheduling Parameters | Scheduling constraints & preferences |
| Student Enrollment | Class Roster |
| Student Schedule | Detailed event schedule per student |
| Throughput Report | Projected number of graduates per type |
| Workshift Calendar | Operating Hours per resource |

In addition to the documents shown in Table I, the expert scheduler also displays a number of screens that are used in managing and administering the training system. The administrative screens available are shown in Table II.

TABLE II

Administration Screen Inventory

| Screen | Description |
|---|---|
| Resource Item Admin. | Define resource inventory & workshifts |
| Course Administration | Define course syllabi |
| Preference Admin. | Define resource allocation preferences |
| Training Administration | Request training & schedule revisions |
| Appointment Admin. | Override automatic schedule |
| Student Administration | Enroll students in training courses |

Selectors provide the user options during administration and reporting. The selectors available are listed in Table III, along with a brief description.

TABLE III

Selector Inventory

| Screen | Description |
|---|---|
| sel_ctype | Selects one course type |
| sel_ctdr | Selects one course type, date range |
| sel_cid | Selects one course type, course id |
| sel_event | Selects one course type, event |
| sel_event_drg | Selects one course type, date range |
| sel_cid_ev | Selects one course type, course id, event |
| sel_crew | Selects one course type, course id, crew |
| sel_ev_crew | Selects one course type, course id, event, crew |
| sel_cidst | Selects one course type, course id, student id |
| sel_ctdrg | Selects one course type, date range |
| sel_rtype | Selects one resource type |
| sel_rid | Selects one resource type, resource id |
| sel_rypedrng | Selects one resource type, date range |
| sel_res_drng | Selects one resource type, resource id, date range |
| sel_stid | Selects one student id |
| sel_date | Selects one date |
| sel_drg | Selects one date range (i.e. begin date, end date) |
| sel_indr | Selects one instructor, date range |
| sel_loc_drg | Selects one location, date range |
| sel_month_rng | Selects start month, year & end month year |

The system may display various messages or prompts. These user interface messages are listed in Table IV, along with their meanings.

TABLE IV

Message Dictionary

| Message | Text |
|---|---|
| err_backup | |
| err_cid | Invalid course id |
| err_config | |
| err_crew | Invalid crew |
| err_ctype | Invalid course type |
| err_date | Invalid date |
| err_dbeg | Invalid start date |
| err_delay | |
| err_dend | Invalid end date |
| err_dur | Invalid time duration |
| err_event | Invalid event |
| err_fclose | System error during file close |
| err_fcreate | System error during file create |
| err_ferase | System error during file erase |
| err_fname | System error during file naming |
| err_fopen | System error during file opening |
| err_fread | System error during file reading |
| err_fseek | System error during file searching |
| err_fwrite | System error during file writing |
| err_inprqd | Input required to continue |
| err_inst | Invalid instructor id |
| err_loc | Invalid location |
| err_lp | Printer not available |
| err_nochoice | Choice list not available |
| err_nodisksp | No disk space available |
| err_prereq | |
| err_restore | |
| err_rid | Invalid resource id |
| err_rtype | Invalid resource type |
| err_stid | Invalid student id |
| err_tbeg | Begin time must be less than end time |
| err_time | Invalid time |
| pmt_cid | Please input a course id |
| pmt_crew | Please input a crew |
| pmt_ctype | Please input a course type |
| pmt_date | Please input a date |
| pmt_dbeg | Please input a start date |
| pmt_dend | Please input an end date |
| pmt_dur | Please input a duration for the event |
| pmt_event | Please input an event |
| pmt_inst | Please input an instructor id |
| pmt_loc | Please input a location |
| pmt_rid | Please input a resource id |
| pmt_rtype | Please input a resource type |
| pmt_stid | Please input a student id |
| rpt_full | Report requests are full - please try later |
| rpt_nodata | No data to report |
| sos_cid | A course id identifies a particular course; e.g. 91001 |
| sos_crew | |
| sos_ctype | A course type |
| sos_date | Dates are entered in form: MM-DD-YY; e.g. 12-31-90 |
| sos_dbeg | Start date is the date of the first training event |
| sos_dend | End date must be no later than start date |
| sos_event | An event identifies a training activity; e.g. hydraulics |
| sos_inprqd | |
| sos_inst | |
| sos_loc | |
| sos_lp | |
| sos_nochoice | Sorry - no choices available at this point |
| sos_nomsg | Sorry - no help available at this point |
| sos_rid | |
| sos_rtype | |
| sos_stid | |
| ver_del_apt | |
| ver_del_cid | |
| ver_del_ctype | |
| ver_del_enrl | |
| ver_del_rid | |
| ver_del_rsv | |
| ver_del_rtype | |
| ver_del_trq | |

As indicated hereinabove, the scheduler of the present invention provides orderly generation of schedules for the training system. This function incorporates rule based Prolog expert system scheduling algorithms for the production of automated schedules to match student training requirements with available instructors, training resources, and training flights for the production of site-specific schedules for the C-141 aircrew training system (ATS). This function:

(a) provides for long range (one year) predictions of resource requirements as compared to resource availability;
(b) provides for resolution of scheduling conflicts;
(c) schedules training events specified in the course syllabi and/or by instructor/training management system (TMS) recommendations against the site master calendar and available training media and instructors;
(d) schedules training devices for Air Force-requested and conducted training events;
(e) requests flight training to include mission requirements which fulfill student training needs;
(f) considers student availability for training and priority for training in matching students and training events;
(g) provides for on line scheduling in each flying squadron with the capability to update the local training flight and schedule files at least daily for ATS formal school training and continuation training (both flying and ground training events);
(h) provides the capability to generate and update on a daily basis each student's ground and flight training requirements;
(i) stores generated schedules for on line retrieval, modification, and printing;
(j) alerts the scheduler when a training medium or device is in danger of exceeding its normally scheduled capacity, and when it is in danger of exceeding programmed surge capacity; and
(k) provides for assignment of start-of-day time for instructor and student on a daily basis, or allow use of a default time (allows scheduling to the hour versus to the day).

The expert scheduler of the present invention provides prioritization. Prioritization occurs on the following basis. Item (1) has priority over item (2), item (a) over item (b), and so on.

ACADEMIC MEDIA (COMPUTER BASED TRAINING, COCKPIT PROCEDURES TRAINER, PART TASK TRAINER, EXCEPT AIR REFUELING PART TASK TRAINER)

(1) Students enrolled in formal school course.
  (a) Within one week of graduation.
  (b) Those delayed by 1 day or more.
(2) Students attending in-unit training courses.
  (a) Those delayed by 1 day or more.
(3) Students in continuation training.

Students in continuation training who are within one week of expiration for academic training events shall be priority (1)(a). Reserve students enrolled at a host base and taking academics (i.e. on Temporary Duty status) have priority (1)(a). Seminars which must be scheduled for a single date are given higher priority.

TRAINING DEVICES (WEAPON SYSTEMS TRAINER, AIR REFUELING PART TASK TRAINER, LOAD MASTER PART TASK TRAINER, GROUND AIRPLANE)

(1) Students enrolled in Formal School course;
  (a) Within one week of graduation;
  (b) Those delayed by 1 day or more;
  (c) Those who required additional training due to poor performance;
(2) Students attending in-unit training courses;
  (a) Those delayed by 1 day or more;
(3) Students in continuation training;
  (a) Reserve at host base due to Temporary Duty status;
  (b) Within one week of expiration of requirement;
  (c) Those delayed by 1 day or more;

TRAINING FLIGHTS (1) Students enrolled in formal school course;
  (a) Within one flight of completing course;
(2) Students attending in-unit training courses;
(3) Students in continuation training;
  (a) Within one week of graduation;
  (b) All others.

FLYING MISSIONS ARE ALLOCATED AGAINST TRAINING NEEDS ON THE FOLLOWING BASIS (1) Match specific missions against special mission requirements of crew members;
(2) Match to less specific mission requirements; and
(3) Match local proficiency sorties with requirements.

Collate and transfer archive data—Schedule data, together with data on schedule conflicts, device, media, and resource availability, and scheduled training throughput shall be available for transfer to the TMS evaluation component of the TMS at the central site.

Scheduling projections—A provision permits the scheduler and management to play "what-if" games by changing student throughput figures, training media availability, instructor numbers, maintenance schedules, etc. This function provides predictive information without affecting the daily operational parameters of the TMS.

This function allows management and schedulers to make temporary modifications and see the effects of:
(a) Varying instructor availability;
(b) Varying training media availability;
(c) Varying student availability;
(d) Varying other scheduling data and parameters;
(e) Varying Student throughput data with time;
(f) Varying instructor numbers, qualification levels, crew member positions with time;
(g) Varying the numbers and capabilities of training media;
(h) Varying the number of training devices available;
(i) Varying operating hours at the entire training site;
(j) Varying the operating hours of the learning center;
(k) Varying the operating hours simulator use;
(l) Varying the maintenance schedule; and
(m) Varying the master calendar.

Student throughput projection—The TMS computes a projection of student throughput for long term for long-term scheduling. Student throughput projections are specified in terms of the number of students per year, categorized by qualification, position and course over time. This data is used for comparison to known registered students, in that, in the short term, the throughput specifies the number of seats that may be filled for an upcoming class. As students enroll, the number of seats decreases, replaced by actual student records.

Online schedule—The TMS includes a function to facilitate the online markup of the current master schedule. This allows instructors and managers to review a schedule online.

Reports—Predefined ATS scheduling and site management reports are as follows:

Daily schedule report—a daily schedule report is the report indicating any conflicts and flagging the occurrence of overflows during scheduling. This kind of report is available on a daily basis for:

Aircrew, Basic Flight Engineer students, and Maintenance Engine Run personnel-instructors; training resources; and instructors, site managers, schedulers and Air Force personnel.

Weekly schedule report—This report is the same as above but produced on a weekly basis. Instructors, site managers, schedulers, Air Force personnel and students use the report.

Monthly schedule report—This report is produced on a monthly basis. Instructors, site managers, schedulers and Air Force personnel use the report. This report is the most widely used.

Database and application software—Database and application software utilizes the Prolog expert system programming language, Informix SQL and 4GL and, where necessary, the "C" programming language. The application software has been written so that it may be ported to any computer system and operating system supported by Informix. Typically, the computer system uses an Intel 80386 processor running UNIX V release 3.2.

System capability relationships—System capability relationships are specified from the perspective of student management in the Formal School, student management in upgrade and continuation training, scheduling of ATS activities, and evaluation of the ATS.

At ATS implementation, training records are created in the TMS for each C-141 aircrew member, for basic flight engineer (BFE) students, and for maintenance engine run (MER) personnel. For students enrolled in the BFE or a formal school course, a course training record is established. For aircrew members and MER personnel attending in-unit upgrade programs and/or continuation training, a summary training record is established. A new course training record is created for each formal course in which the crew member is enrolled. During the career of the C-141 crew member or MER personnel, the summary training record is updated for continuation training and formal school training.

Figure 2:
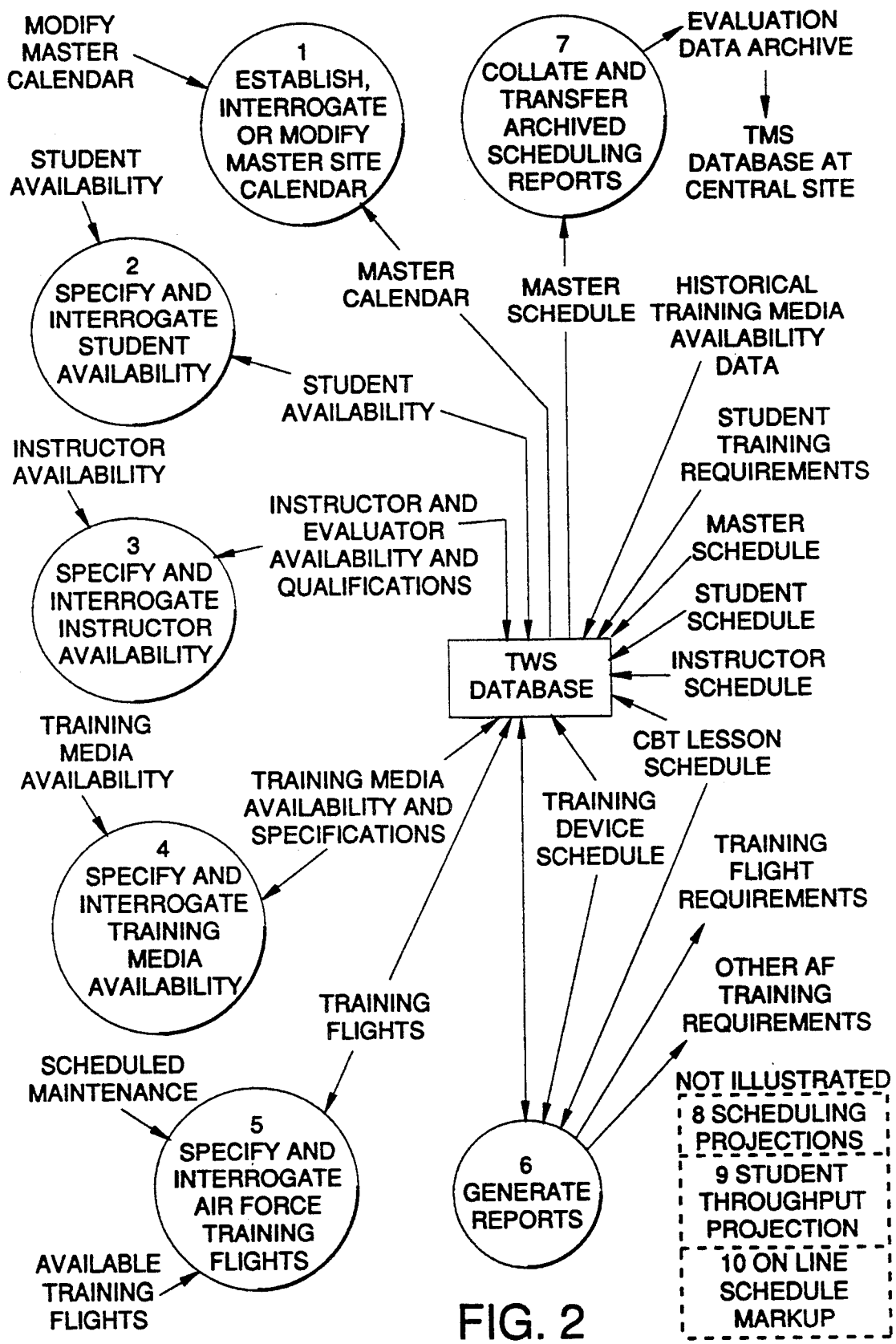
FIG. 2 is a functional diagram showing the operation of the expert scheduler of the present invention as applied to an exemplary embodiment in an aircrew training system.

Referring now to FIG. 2 of the drawings, there is shown is a functional diagram illustrating the operation of the expert scheduler of the present invention. It forms a part of the Training Management System (TMS) which in turn forms a part of the Aircrew Training System for the C-141 Aircraft. The TMS computerizes or automates support for training service administration, management and operations and is deployed independently at a plurality of sites and provides a number of functions including access and security, student management and performance reporting, evaluation of the C-141 Aircrew Training System, and report generation to support management and operations. The expert scheduler of the present invention handles scheduling and training site management. The scheduler delivers earliest opportunity schedules that satisfy allocation policies under limited resource availability, and handles an unlimited number of students, resources and instructors. It generates schedules for a full year to the 15 minute interval level or resolution. It satisfies all priorities, and resolves or identifies all conflicts.

At the center of FIG. 2 is the TMS data base which is located at the central site. Seven functional bubbles are shown around the TMS data base, and three additional functions are not illustrated. Bubble number one is related to the master calendar, and is labeled "establish, interrogate or modify master site calendar." The second bubble is related to student availability, and is labeled "specify and interrogate student availability". Bubble number three is related to instructor availability, and is labeled "specify and interrogate instructor availability." Furthermore, the space between bubble number three and the TMS database is labeled "instructor and evaluator availability and qualifications." Bubble number four is related to training media, and is labeled "specify and interrogate training media availability." The space between bubble number four and the TMS database is labeled "training media availability and specifications." An arrow from the outer margin pointing in to the bubble is labeled "scheduled maintenance." Bubble number five relates to training flights, and is labeled "specify and interrogate Air Force training flights." Bubble number six relates to schedules and is labeled "generate schedules." It has seven arrows pointing inward toward the TMS data base. They are labeled: training device schedule; CBT (computer based training) lesson schedule; instructor schedule; student schedule; master schedule; student training requirements; and historical training media availability data. Bubble number six has two arrows that extend outward toward the margin. They are labeled "training flight requirements" and "other requirements for AF (Air Force) training." Bubble number seven is labeled "collate and transfer archived scheduling reports." It has an arrow extending from the TMS data base toward the bubble labeled "master schedule". It has an arrow extending from the bubble toward the TMS data base at central site labeled "evaluation data archive." Items number eight, nine and ten are not illustrated with a bubble and arrows. Item number eight is labeled "scheduling projections." Item number nine is labeled "student throughput projection." Item number ten is labeled "online schedule markup."

Figure 3:
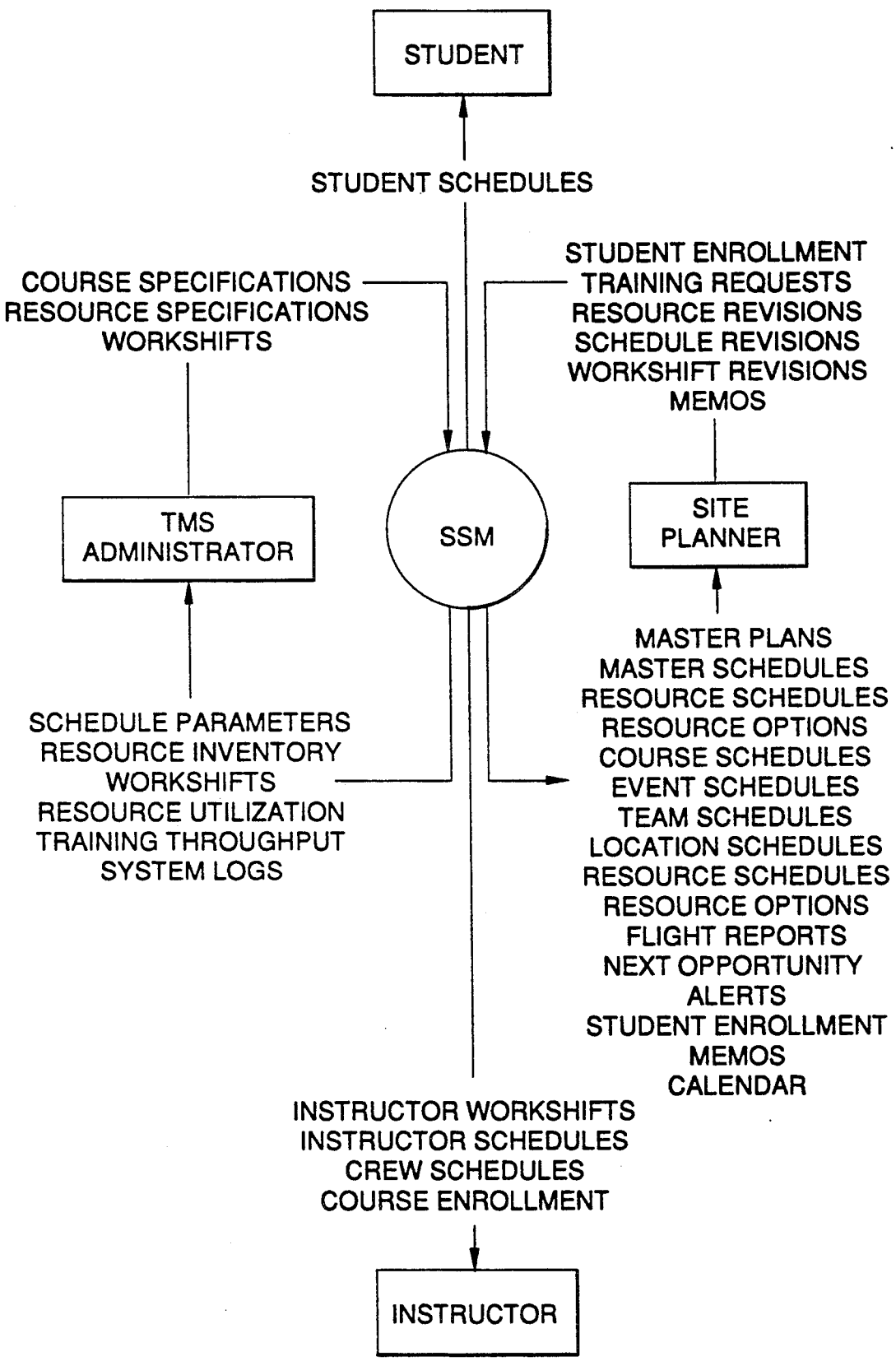
FIG. 3 is a diagram giving the transactional perspective of the training system incorporating the invention as diagrammed in FIG. 2.

FIG. 3 is a diagram illustrating the transactional perspective of the training system incorporating the expert scheduler of the present invention. At the center is a circle labeled SSM (Scheduling and Site Management). This is where the expert scheduler of the present invention is embedded. Above the circle is a rectangle labeled "Student." An arrow labeled "Student Schedules" extends from the circle to the upper rectangle. Below the circle is a rectangle labeled "Instructor." An arrow extends downward labeled: Instructor Workshifts; Instructor Schedules; Crew Schedules; and Course Enrollment. To the left of the circle is a rectangle labeled "TMS Administrator." An arrow extends to the right labeled: Course Specifications; Resource Specifications; and Workshifts. An arrow extends to the left labeled: Schedule Parameters; Resource Inventory; Workshifts; Resource Utilization, Training Throughput; and System Logs. To the right of the circle is a rectangle labeled "Site Planner." An arrow extends to the left labeled: Student Enrollment; Training Requests; Resource Revisions; Schedule Revisions; Workshift Revisions; and Memos. An arrow extends to the right labeled Master Plans; Master Schedules; Resource Schedules; Course Schedules; Event Schedules; Team Schedules; Location Schedules; Resource Options; Flight Reports; Next Opportunity; Alerts; Student Enrollment; Memos; and Calendar.

Figure 4:
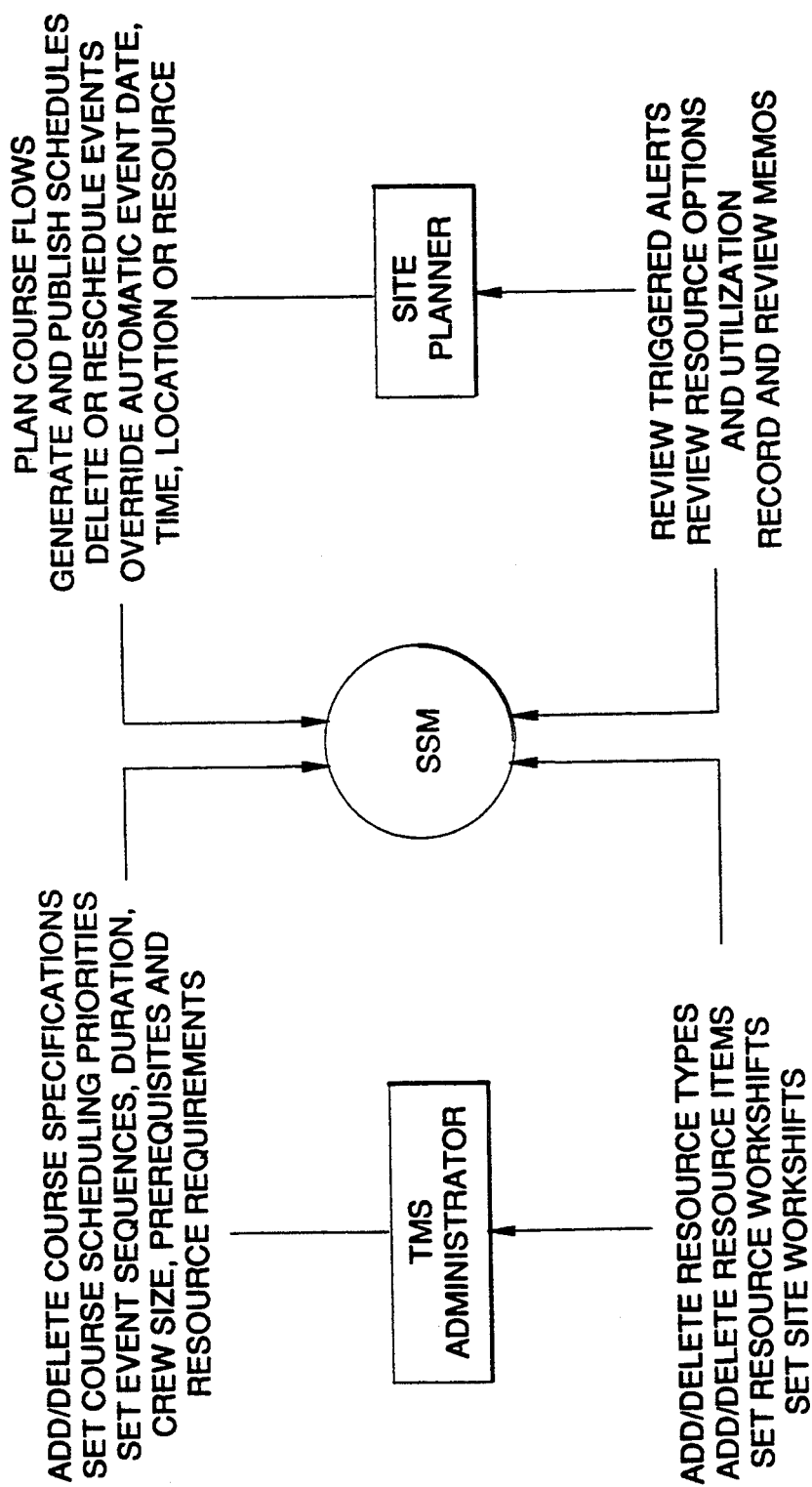
FIG. 4 is a diagram giving the service perspective of the training system incorporating the expert scheduler as diagrammed in FIGS. 2 and 3.

FIG. 4 is a diagram illustrating the service perspective of the training system incorporating the expert system of the present invention. At the center is the circle labeled SSM, on the right is the rectangle labeled Site Planner, and on the left is the rectangle labeled TMS Administrator. A first arrow extends from the left labeled: Add/delete resource types; Add/delete resource items; Set resource workshifts; and Set site workshifts. A second arrow extends from the left labeled: Add/delete course specifications; Set course scheduling priorities; and Set event sequence, duration, crew size, prerequisites and resource requirements. A first arrow extends from the right labeled: Review triggered alerts; Review resource options and utilization; and Record and review memos. A second arrow extends form the right labeled: Plan course flows; Generate and publish schedules; Delete or reschedule events; and Override automatic event date, time location or resource.

Figure 5:
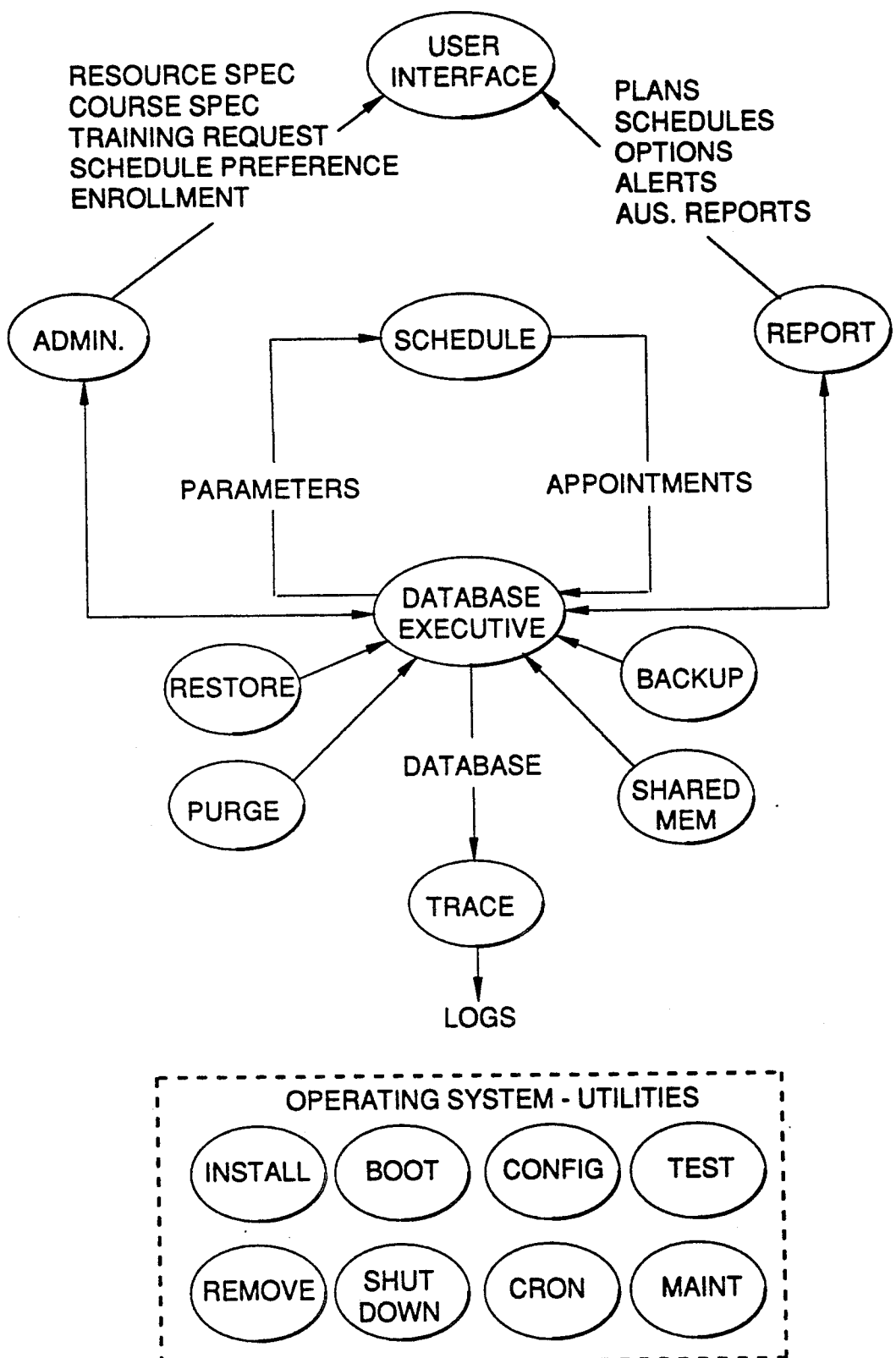
FIG. 5 is a diagram giving the data flow perspective of the training system incorporating the invention as diagrammed in FIGS. 2-4.

FIG. 5 is a diagram illustrating the data flow perspective of the training system incorporating the expert scheduler of the present invention. At the top is an oval labeled UI (user interface). Below and to the left is an oval labeled ADM (administration). An arrow extends from the ADM oval to the UI oval and it is labeled: Resource Spec; Course Spec; Training Request: Schedule Preference; and Enrollment. Below and to the right of the UI oval is an oval labeled RPT (Report). An arrow extends from the RPT oval to the UI oval and it is labeled: Plans; Schedules; Options; Alerts; and Aux. Reports. An oval labeled DBX (data base change) is located below the UI oval and has a two headed arrow extending to the ADM oval. A single headed arrow extends from the DBX oval to the RPT oval. Between the UI oval and the DBX oval is an oval labeled SCHED. On the left, an arrow extends from the DBX oval to the SCHED oval and is labeled Params (Parameters). An arrow extends from the SCHED oval to the DBX oval and is labeled Appointments.

Below the DBX oval is a straight line extending to a label DB (data base). Below and to the left of the DBX oval is an oval labeled RESTORE. An arrow extends from the RESTORE oval to the DBX oval. Below the RESTORE oval is an oval labeled PURGE. An arrow extends from the PURGE oval to the DBX oval. Below and to the right of the DBX oval is an oval labeled BACKUP. An arrow extends from the DBX oval to the BACKUP oval. Below the BACKUP oval is an oval labeled SHARED MEM (memory). A double headed arrow extends between the DBX oval and the SHARED MEM oval. Below the DBX oval is an oval labeled TRACE. The TRACE oval has an arrow connected to a legend: LOGS. The TRACE oval has an incoming open-ended arrowhead. At the bottom of FIG. 5 is a 2×4 matrix of unconnected ovals labeled: INSTALL; BOOT; CONFIG; TEST; REMOVE; SHUTDN; CRON; and MAINT.

Figure 6A:
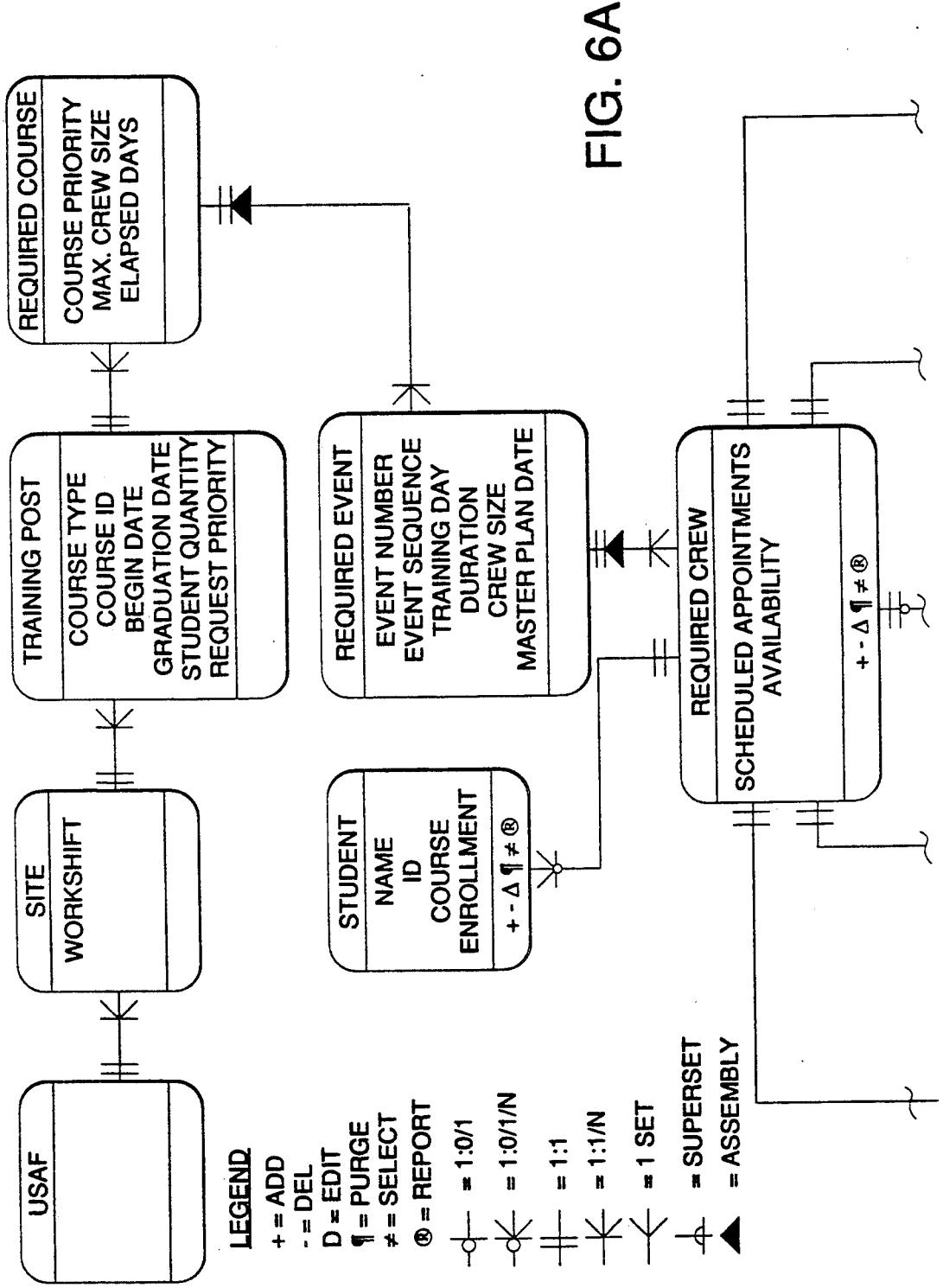
FIGS. 6A and 6B are a diagram giving the object perspective of the training system incorporating the invention as diagrammed in FIGS. 2-5.
Figure 6B:
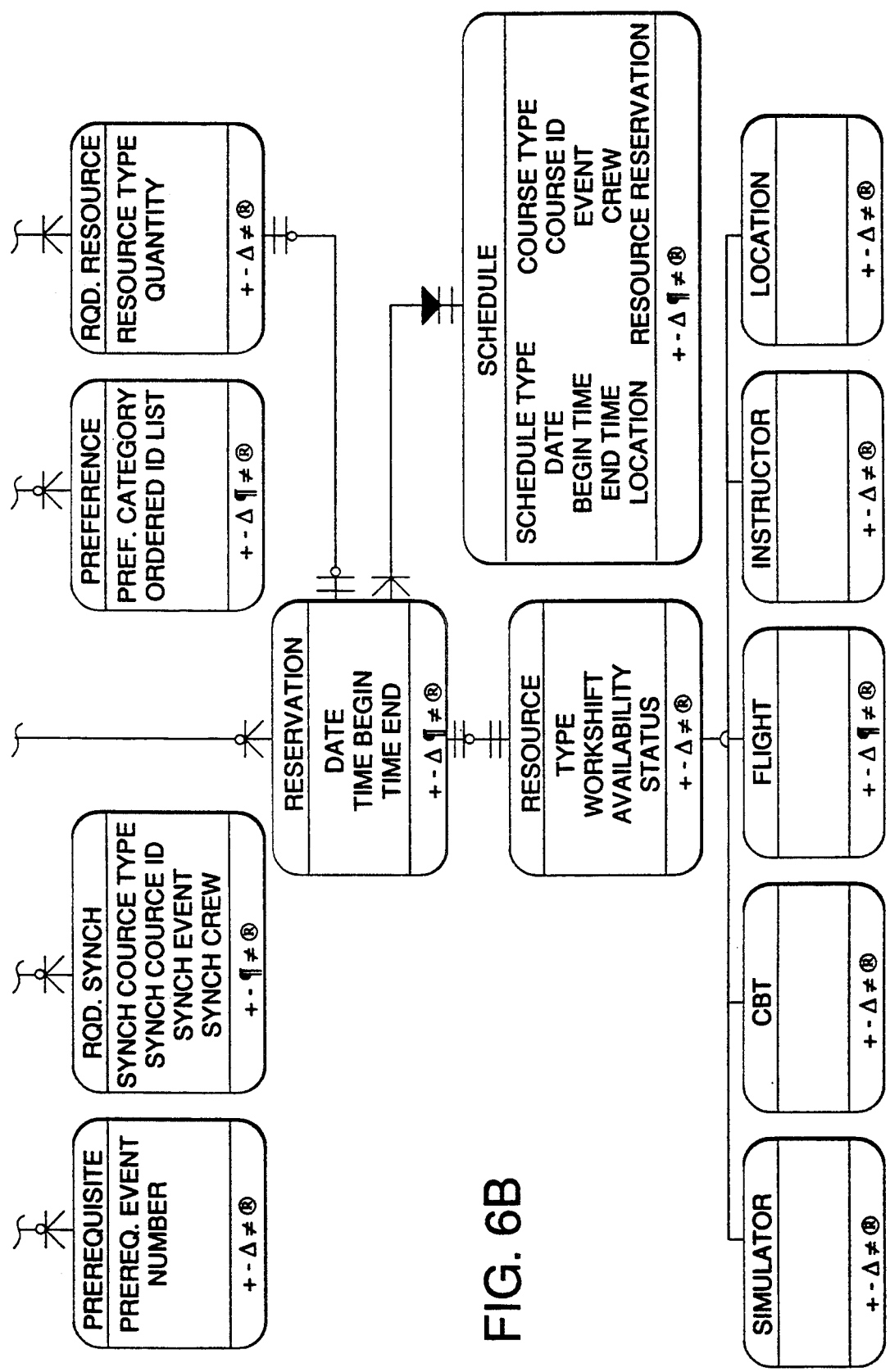

FIG. 6 is a diagram illustrating the object perspective of the training system incorporating the expert scheduler of the present invention.

Figure 7A:
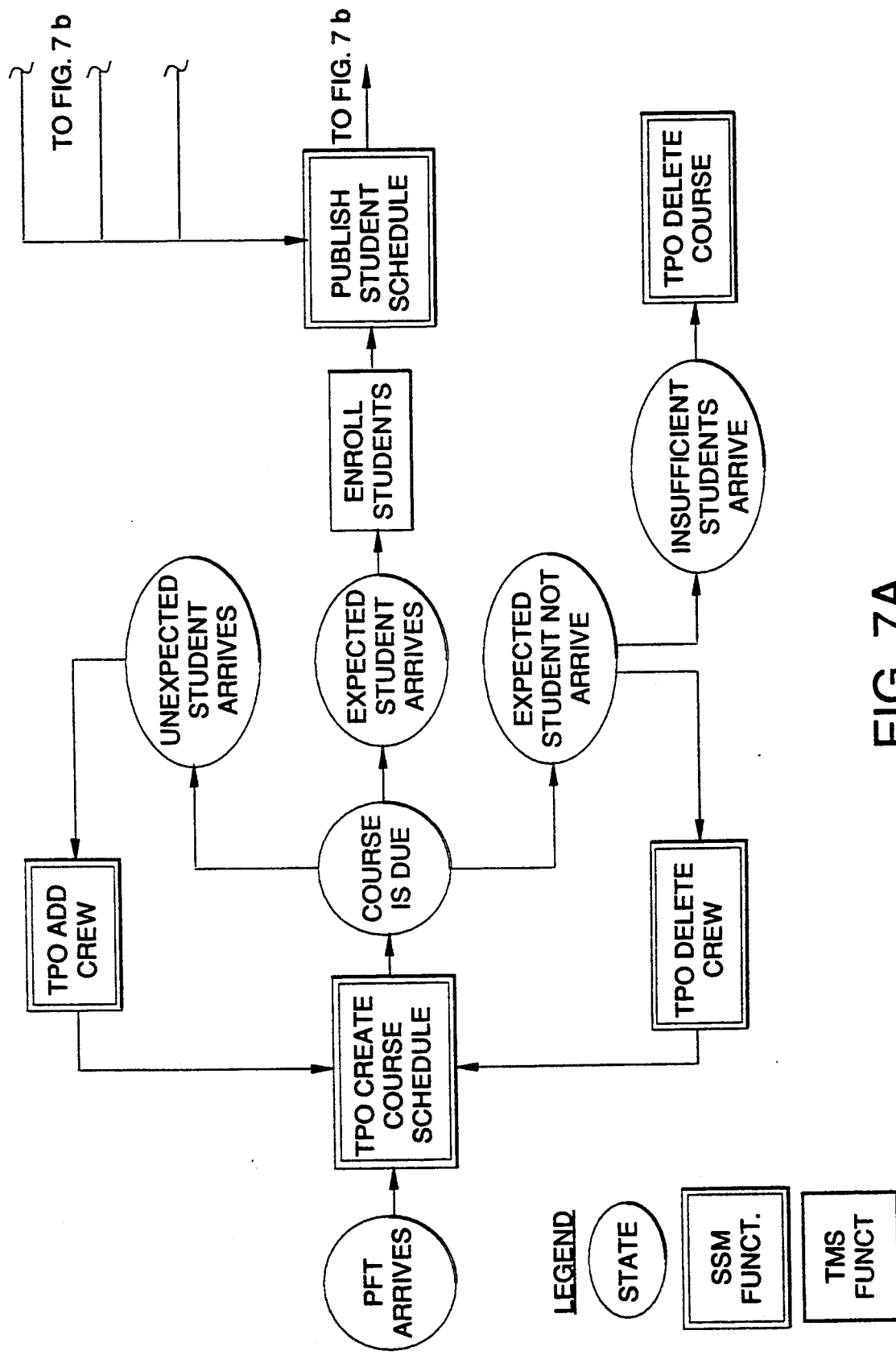
FIGS. 7A and 7B are a diagram giving the student state perspective of the training system incorporating the invention of FIGS. 2-6.
Figure 7B:
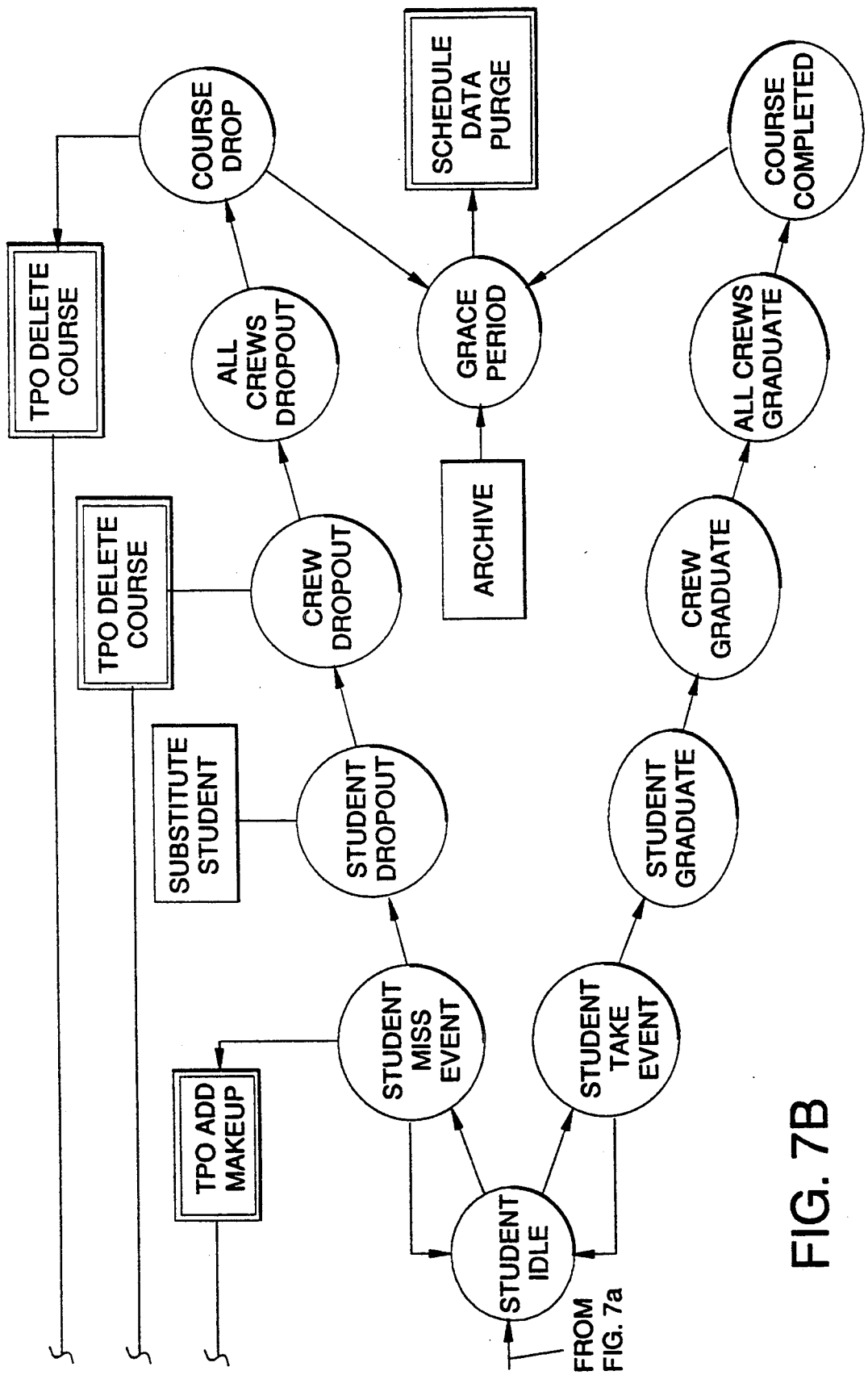

FIG. 7 is a diagram illustrating the student state perspective of the training system incorporating the expert scheduler of the present invention.

Figure 8A:
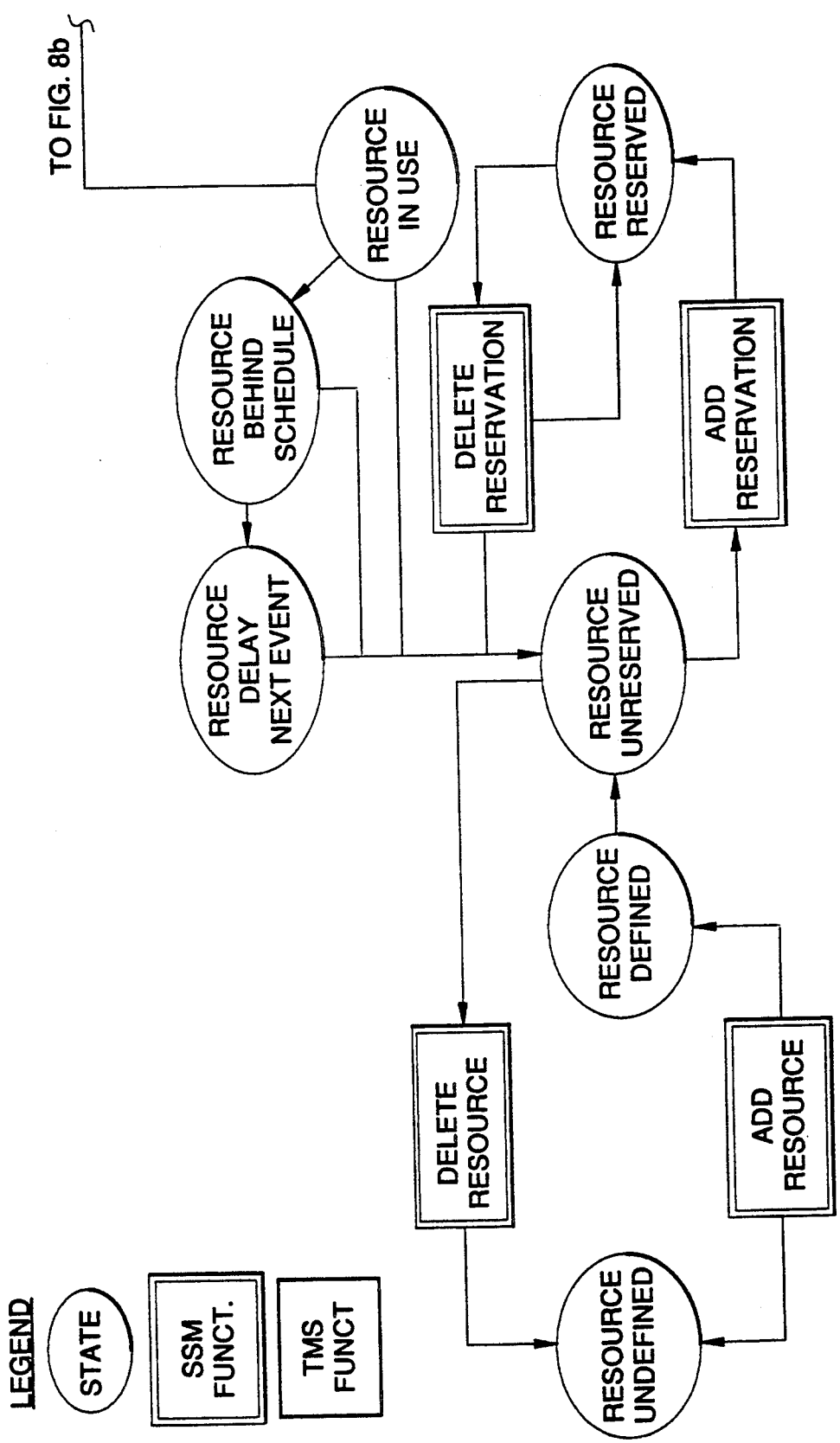
FIGS. 8A and 8B are a diagram giving the resource state perspective of the training system incorporating the invention of FIGS. 2-7.
Figure 8B:
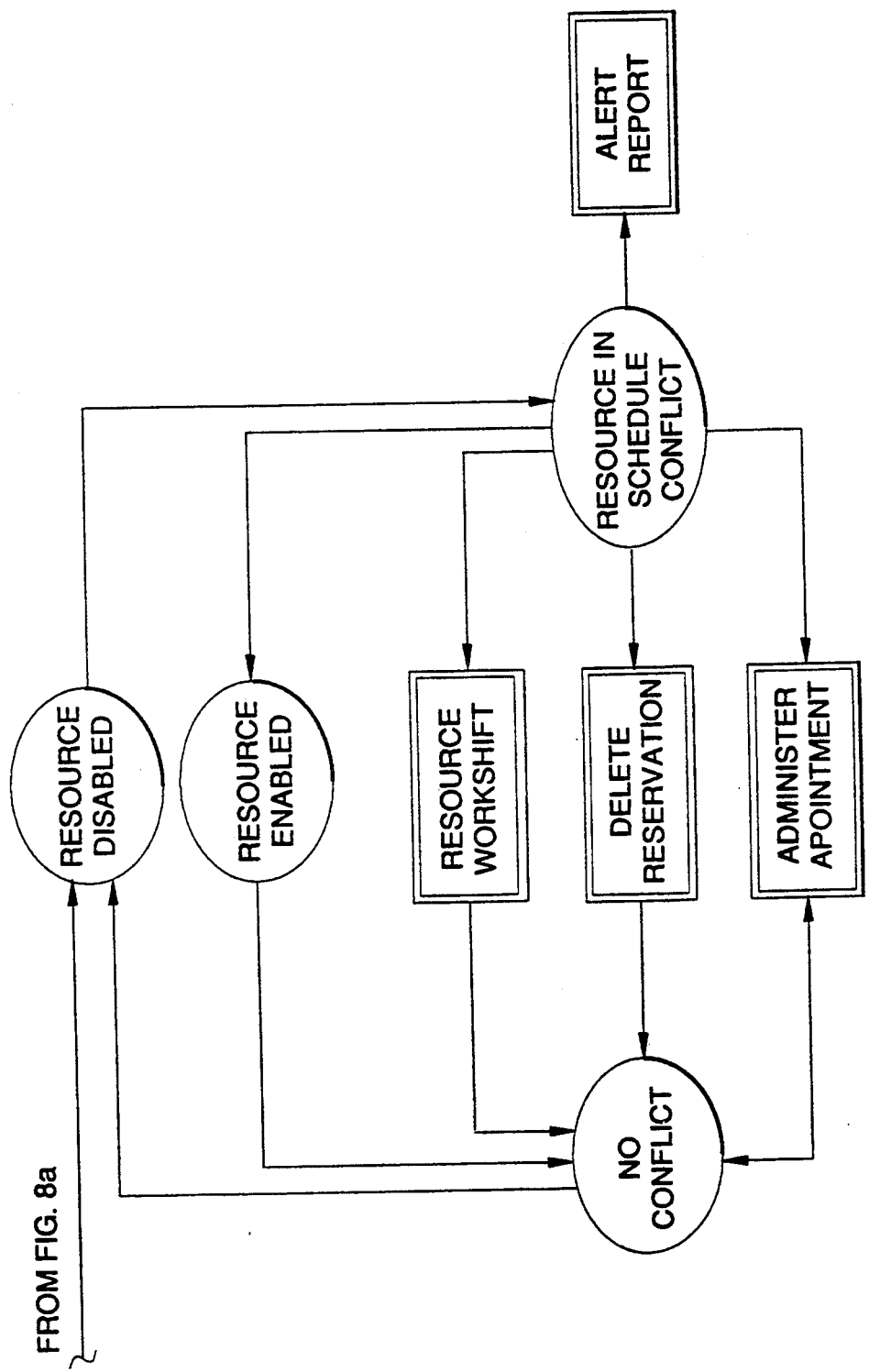

FIG. 8 is a diagram illustrating the resource state perspective of the training system incorporating the expert scheduler of the present invention.

Figure 9A:
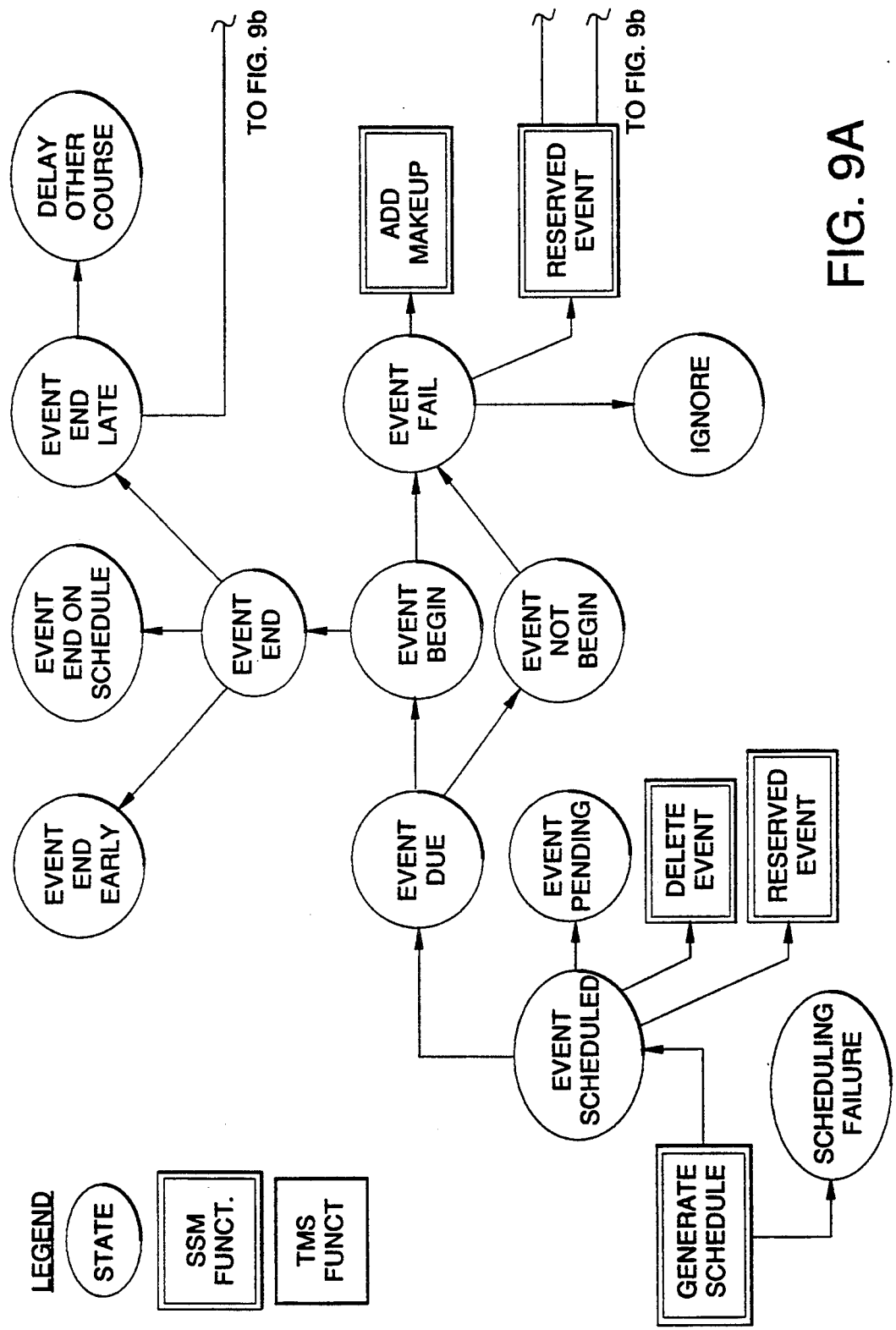
Figure 9B:
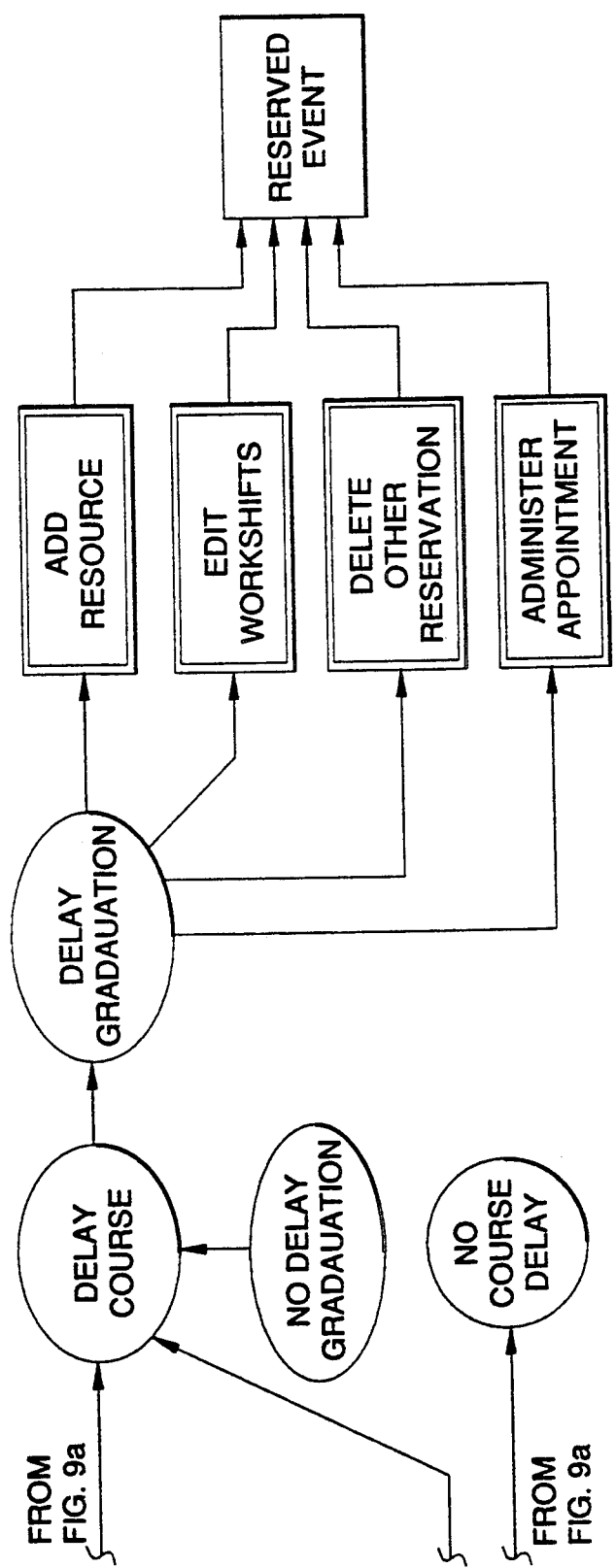

FIG. 9 is a diagram illustrating the training event perspective of the training system incorporating the expert scheduler of the present invention.

Thus there has been described a new and improved expert system scheduler that performs administrative and managerial functions necessary for operating, managing and revising of the schedules for training systems. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An expert system scheduler for flexibly scheduling training events at a plurality of training sites notwithstanding the occurrence of resource conflicts, each training site comprises one of a plurality of distributed computers that are interconnected by means of an interconnecting link, the plurality of distributed computers interconnected to a central processor including a database, and wherein the remainder of the computers comprise remote processors, and wherein the database comprises: (1) a list of students input from the plurality of remote computers, (2) a list of instructors, and (3) a list of available flight training events, and wherein the availability of the students, the instructors and the available training events vary over time, and wherein the expert system scheduler comprises processing means that are disposed on each of the remote processors, said expert system scheduler comprising:

means for selectively generating a master plan in response to training requests supplied by users, which master plan provides an event flow that specifies target dates for each training event, but does not specify the exact time or resources and does not take into account whether sufficient resources are available on a target date, which training requests inform the scheduler that a specific number of users should be scheduled for a particular training event, and stipulate required starting and ending dates for the events, the master plan providing users with a preview of the proposed event sequence and an overview of all events which are targeted for the same date;

means for adjusting the master plan so that users may adjust starting, interim and ending training dates in order to express preferred scheduling constraints;

means for selectively generating a master schedule in response to training requests and the users preferred scheduling constraints which reserves specific dates, times, locations and resources for each training event to fulfill scheduled training requests;

means for generating conflict alerts to notify users if conflicts with the master schedule exist;

means for generating revised training requests in response to conflict alerts; and means for automatically generating schedule revision options in response to the revised training requests which appropriately reschedule the sites in view of conflicts;

wherein the expert system scheduler flexibly schedules and reschedules training events at each of the sites notwithstanding resource conflicts, and wherein schedules are automatically generated and conflicts resolved.

2. The expert system scheduler of claim 1 which further comprises:
means for selectively generating schedules indexed on user, instructor, resource, and event in response to user requests.

3. The expert system scheduler of claim 1 which further comprises:
means for displaying the master plan to provide facilities for users to review and revise the master plan.

4. The expert system scheduler of claim 1 which further comprises:
means for initializing a workshift calendar and a scheduling parameters database that stipulate general scheduling constraints, which parameters are used by the scheduler to restrict the dates and times during which resources may be used and to establish priorities by which resources are allocated.

5. An expert system scheduler for flexibly scheduling training events at a plurality of training sites notwithstanding the occurrence of resource conflicts, each training site comprises one of a plurality of distributed computers that are interconnected by means of an interconnecting link, the plurality of distributed computers interconnected to a central processor including a database, and wherein the remainder of the computers comprise remote processors, and wherein the database comprises: (1) a list of students input from the plurality of remote computers, (2) a list of instructors, and (3) a list of available flight training events, and wherein the availability of the students, the instructors and the available training events vary over time, and wherein the expert system scheduler comprises processing means that are disposed on each of the remote processors, said expert system scheduler comprising:
means for selectively generating a master plan in response to training requests supplied by users, which master plan provides an event flow that specifies target dates for each training event, but does not specify the exact time or resources and does not take into account whether sufficient resources are available on a target date, which training requests inform the scheduler that a specific number of users should be scheduled for a particular training event, and stipulate required starting and ending dates for the events, the master plan providing users with a preview of the proposed event sequence and an overview of all events which are targeted for the same date;
means for users to adjust the starting, interim and ending training dates in order to select preferred scheduling times;
means for selectively generating a master schedule in response to training requests which reserves specific dates, times, locations and resources for each training event to fulfill scheduled training requests;
means for selectively generating schedules indexed on user, instructor, resource, and event in response to user requests;
means for generating conflict alerts to notify users if conflicts with the master schedule exist;
means for generating revised training requests in response to conflict alerts; and
means for automatically generating schedule revision options in response to the revised training requests which appropriately reschedule the sites in view of conflicts;
wherein the expert system scheduler flexibly schedules and reschedules training events at each of the sites notwithstanding resource conflicts, and wherein schedules are automatically generated and conflicts resolved.

6. The expert system scheduler of claim 5 which further comprises:
means for displaying the master plan to provide facilities for users to review and revise the master plan.

7. The expert system scheduler of claim 5 which further comprises:
means for initializing a workshift calendar and a scheduling parameters database that stipulate general scheduling constraints, which parameters are used by the scheduler to restrict the dates and times during which resources may be used and to establish priorities by which resources are allocated.

8. A method of flexibly scheduling training events at a plurality of training sites notwithstanding the occurrence of resource conflicts, each training site comprises one of a plurality of distributed computers that are interconnected by means of an interconnecting link, the plurality of distributed computers interconnected to a central processor including a database, and wherein the remainder of the computers comprise remote processors, and wherein the database comprises: (1) a list of students input from the plurality of remote computers, (2) a list of instructors, and (3) a list of available flight training events, and wherein the availability of the students, the instructors and the available training events vary over time, and wherein the expert system scheduler comprises processing means that are disposed on each of the remote processors, said method comprising the steps of:
selectively generating a master plan in response to training requests supplied by users, which master plan provides an event flow that specifies target dates for each training event, but does not specify the exact time or resources and does not take into account whether sufficient resources are available on a target date, which training requests inform the scheduler that a specific number of users should be scheduled for a particular training event, and stipulate required starting and ending dates for the events, the master plan providing users with a preview of the proposed event sequence and an overview of all events which are targeted for the same date;
adjusting the master plan so that users may adjust starting, interim and ending training dates in order to express preferred scheduling constraints;
selectively generating a master schedule in response to training requests and the users preferred scheduling constraints which reserves specific dates, times, locations and resources for each training event to fulfill scheduled training requests;
generating conflict alerts to notify users if conflicts with the master schedule exist;
generating revised training requests in response to conflict alerts; and
automatically generating schedule revision options in response to the revised training requests which appropriately reschedule the sites in view of conflicts;
wherein the method flexibly schedules and reschedules training events at each of the sites notwithstanding resource conflicts, and wherein schedules are automatically generated and conflicts resolved.

9. The method of claim 8 which further comprises the step of:
   displaying the master plan to provide facilities for users to review and revise the master plan.

10. The method of claim 8 which further comprises the step of:
    selectively generating schedules indexed on user, instructor, resource, and event in response to user requests.

11. The method of claim 8 which further comprises the step of:
    initializing a workshift calendar and a scheduling parameters database that stipulate general scheduling constraints, which parameters are used by the scheduler to restrict the dates and times during which resources may be used and to establish priorities by which resources are allocated.

12. A method of flexibly scheduling training events at a plurality of training sites notwithstanding the occurrence of resource conflicts, each training site comprises one of a plurality of distributed computers that are interconnected by means of an interconnecting link, the plurality of distributed computers interconnected to a central processor including a database, and wherein the remainder of the computers comprise remote processors, and wherein the database comprises: (1) a list of students input from the plurality of remote computers, (2) a list of instructors, and (3) a list of available flight training events, and wherein the availability of the students, the instructors and the available training events vary over time, and wherein the expert system scheduler comprises processing means that are disposed on each of the remote processors, said expert system scheduler comprising:
    selectively generating a master plan in response to training requests supplied by users, which master plan provides an event flow that specifies target dates for each training event, but does not specify the exact time or resources and does not take into account whether sufficient resources are available on a target date, which training requests inform the scheduler that a specific number of users should be scheduled for a particular training event, and stipulate required starting and ending dates for the events, the master plan providing users with a preview of the proposed event sequence and an overview of all events which are targeted for the same date;
    displaying the master plan to provide facilities for users to review and revise the master plan;
    adjusting the starting, interim and ending training dates in order to select preferred scheduling times;
    selectively generating a master schedule in response to training requests which reserves specific dates, times, locations and resources for each training event to fulfill scheduled training requests;
    selectively generating schedules indexed on user, instructor, resource, and event in response to user requests;
    generating conflict alerts to notify users if conflicts with the master schedule exist;
    generating revised training requests in response to conflict alerts; and
    automatically generating schedule revision options in response to the revised training requests which appropriately reschedule the sites in view of conflicts;
    wherein the expert system scheduler flexibly schedules and reschedules training events at each of the sites notwithstanding resource conflicts, and wherein schedules are automatically generated and conflicts resolved.

13. The method of claim 12 which further comprises the step of:
    selectively generating schedules indexed on user, instructor, resource, and event in response to user requests.

14. The method of claim 12 which further comprises the steps of:
    initializing a workshift calendar and a scheduling parameters database that stipulate general scheduling constraints, which parameters are used by the scheduler to restrict the dates and times during which resources may be used and to establish priorities by which resources are allocated.

* * * * *